United States Patent [19]

Trott

[11] 4,058,013
[45] Nov. 15, 1977

[54] MEAT THERMOMETER
[75] Inventor: David H. Trott, Cincinnati, Ohio
[73] Assignee: Crossbow, Inc., Cincinnati, Ohio
[21] Appl. No.: 722,650
[22] Filed: Sept. 13, 1976

Related U.S. Application Data

[63] Continuation-in-part of Ser. No. 664,624, March 8, 1976.

[51] Int. Cl.² .................... G01K 5/62; G01K 13/00
[52] U.S. Cl. ................................. 73/352; 73/363.9
[58] Field of Search ............... 73/352, 363.7, 363.9, 73/431

[56] References Cited
U.S. PATENT DOCUMENTS

| 1,676,673 | 7/1928 | Stalker | 73/431 |
| 2,023,544 | 12/1935 | Pierson | 73/363.9 X |
| 3,373,611 | 3/1968 | Trott | 73/352 |

Primary Examiner—Richard C. Queisser
Assistant Examiner—John S. Appleman
Attorney, Agent, or Firm—Wood, Herron & Evans

[57] ABSTRACT

A meat thermometer for barbecue grills, broilers, or ovens having a stem containing a bimetallic element in one end thereof, a cylindrical housing secured to the other end of the stem, an indicator within the housing and rotatable in the housing in response to changes of temperature as detected by the bimetallic element, said housing including a cap secured thereto by means passing through the housing and located out of the path of said indicator. The cylindrical housing has a semi-circular slot through which said indicator is visible, said semi-circular slot having temperature calibrations on its surface. The housing is sandwiched between a disk on the stem and a cap, the housing having a recess which eliminates the tendency of the cap to cock with respect to the disk upon assembly.

4 Claims, 9 Drawing Figures

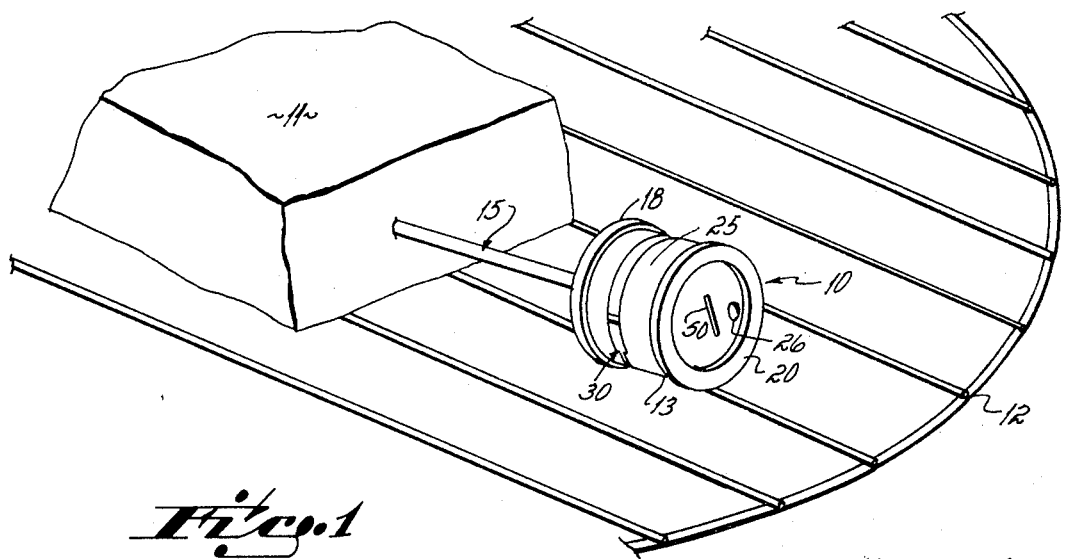
Fig. 1
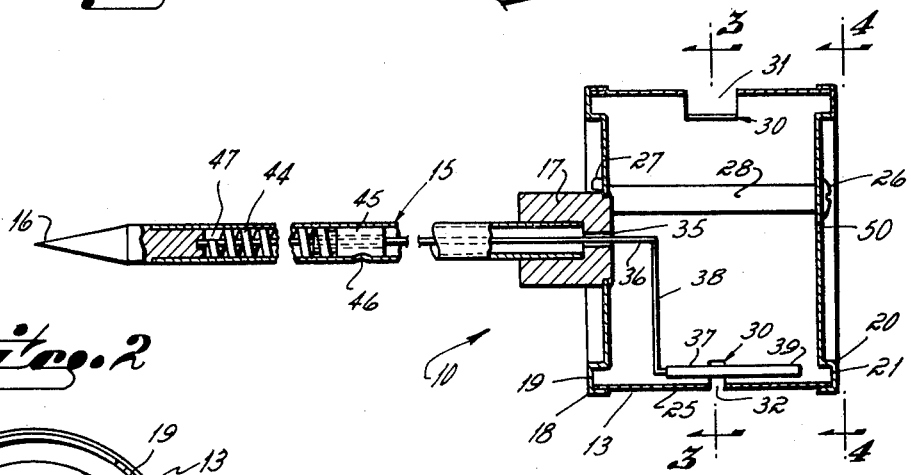
Fig. 2
Fig. 3
Fig. 5
Fig. 4
Fig. 6

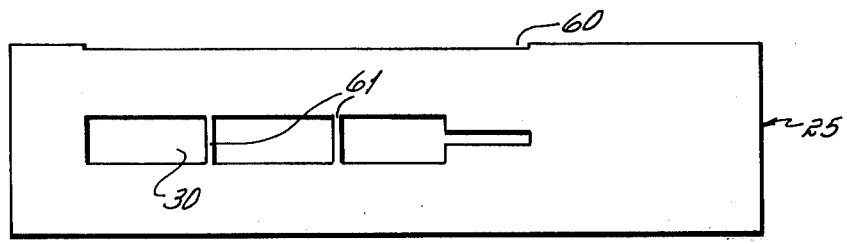
Fig. 7
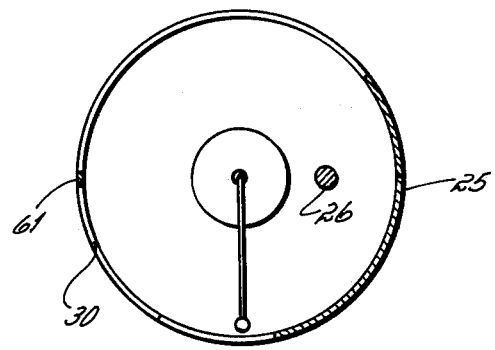
Fig. 8
Fig. 9

MEAT THERMOMETER

This is a continuation-in-part of pending application Ser. No. 664,624, filed Mar. 8, 1976 entitled Meat Thermometer.

This invention relates to a thermometer, and more particularly, the invention is directed to a meat thermometer for use when broiling meat on a grill or in an oven.

In outdoor grilling, for example, while instruction books may provide times for grilling each side of the meat, there are a number of variables involved in the grilling process which can affect the results and make it difficult for the average outdoor chef to achieve uniform results. For example, the initial temperature of the meat is a significant factor. That cut of meat which comes to the grill directly from the refrigerator will take a longer cooking time than that which has been sitting at room temperature. The number of coals, the quality of the coals, the degree to which they are covered with ash, all affect grilling time. Ambient temperature as well as wind conditions and height of the grill with respect to the coals affect the cooking time.

It is therefore desirable to provide a meat thermometer which will accurately show the internal temperature of meat being grilled so that regardless of the different conditions referred to above, the outdoor chef will know first, when to turn the meat, and second, when to take it off the grill in order to achieve uniform results.

There are a number of meat thermometers available, called roast meat thermometers, but all are designed for cooking larger cuts of meat such as roasts, hams, or poultry. They are not suitable for cooking meats which are commonly broiled, namely, thinner cuts such as steaks, chops, or ground meat patties.

To appreciate why existing thermometers are not suitable for broiling or grilling, it is necessary to understand what is involved in monitoring meat cooking with a thermometer.

To perform this task satisfactorily, that part of the thermometer which senses temperature, normally in the latter inch or two of the stem, should be located in the central portion of the meat. If the stem end is not so placed, the temperature indicated on the dial will not be representative of the meat as a whole, so that the latter may be over or under cooked.

When roasting a large cut of meat, typically several inches thick, the thermometer stem is simply thrust in from the top, or at an angle from the side. So long as the stem end is more or less centrally located, the attitude of the stem is unimportant.

When cooking thinner cuts of meat using the broiling method, however, the only way the stem end can be properly located in the center of the meat is to insert the stem from the side, halfway between the top and bottom of the meat, parallel to the cooking surface or meat pan.

There are several reasons why roasting thermometers are difficult or impossible to use in such fashion.

One reason is that they are too bulky. Most have stems one quarter of an inch thick, difficult to insert in meat which itself may be only one inch thick. And many have a dial at a right angle to the stem, said dial being sufficiently large in diameter to make it impossible to insert the stem horizontally as required and still permit the meat to lie flat on the cooking surface or the pan.

Moreover, even if it were possible to place the stem of a roasting thermometer in the proper position in meat to be broiled, the usefulness of any thermometer having a dial perpendicular to the stem, as described above, would be severely limited by the difficulty of reading the dial. In many grills, any view of the perpendicular face of the dial would be blocked by the side walls of the grill.

Apart from shortcomings attributable to shape and bulk, most existing meat thermometers lack one quality essential to use for broiling or grilling, namely, adequate heat resistance.

When roasting, oven temperatures are carefully controlled and seldom exceed 400° F. When broiling, however, most particularly on charcoal, temperatures may exceed 500° or 600° F., and open flame of much higher temperature may occasionally be encountered. The head, or dial assembly of many roasting thermometers, while resistant to the oven temperatures for which they are designed, will not withstand the more severe ambience of broiling. Gasket material will oxidize. Thin dial faces and needles will distort in shape. Transparent dial covers will become discolored and opaque.

It has been an objective of the present invention to provide an improved meat thermometer which can not only serve for roasting, as do prior thermometers, but also for broiling, and which is convenient to use, easily viewed, reliable and durable.

The objective of the invention is achieved by the structure of the housing containing the indicator, the structure having a number of features.

First, the housing is cylindrical with the calibration marks being on the cylindrical surface; thus, the calibration marks and the indicator can be viewed by the chef standing in a normal upright position adjacent the grill.

Second, the housing and indicator are assembled in such a way that the indicator has over 300° (angular) of unobstructed path of movement.

Third, the cylindrical housing is approximately 1 inch in diameter which is large enough to present the temperature calibrations in an easily viewed form but is small enough so that it can be inserted into the edge of meat as thin as 1 inch thick and still lie on top of a grill or broiling pan.

Fourth, this thermometer is constructed solely of materials of a type and gauge designed to withstand the extreme temperatures frequently encountered in broiling or grilling. The stem, dial housing, assembly hardware and indicator needle are stainless steel. The dial may also be fashioned of stainless steel, or just as successfully from heavy gauge aluminum. All materials used are highly heat resistant and non-corrosive.

The housing has a circumferential slot through which the indicator is visible. The slot, over the operating range of the thermometer, is about 5/32 inch wide so that the indicator is quite visible. However, the slot is about 1/16 inch wide in the area where the indicator normally rests at room temperature. The narrow slot keeps the indicator protected when the thermometer is in a drawer with other utensils, but nevertheless permits the indicator to be viewed so that the chef can detect its initial movement if desired.

The stem on the thermometer is preferably sandblasted or etched along the outer portion of it adjacent the indicator housing, leaving a contrasting shiny finish on the tip portion of the stem, thereby providing an easily viewed indication to the chef of the depth of penetration necessary for satisfactory operation of the thermometer.

The outer end of the thermometer is preferably slotted so as to receive a knife or other implement, thereby permitting the thermometer to be rotated so that the calibrations can always be turned to the best position for viewing.

It should be noted that the preferred embodiment of the invention has no glass overlying the dial calibrations, contrary to conventional dial thermometers. While a high temperature glass cover presumably could be incorporated in the invention, this could be done only at considerable sacrifice in the legibility of the dial due to the necessity of reducing the dial surface almost 20% in order to accommodate the glass.

An objective of the invention has been to provide a configuration for the cylindrical housing which, upon assembly of the thermometer, will promote a uniform, neat appearance of the unit. In the construction of the unit with an eccentric bolt interconnecting a disk and cap between which the housing is sandwiched, there is a tendency for the cap to cock out of parallelism with respect to the disk. It has been found that by providing a recess in the upper edge of the housing remote from the bolt, that tendency to cock is eliminated. Further, the invention contemplates the use of two slim integral bridging elements across the viewing slot which resist the tendency of the slot to close down when pressure of the clamping bolt to the assembly is applied.

The several features of the invention will become more readily apparent from the following detailed description taken in conjunction with the accompanying drawings in which:

FIG. 1 is a perspective view of the thermometer shown inserted into a steak and overlying a grill;

FIG. 2 is a longitudinal cross-sectional view through the thermometer;

FIG. 3 is a cross-sectional view taken along lines 3—3 of FIG. 2;

FIG. 4 is an end elevational view taken along lines 4—4 of FIG. 2;

FIG. 5 is a developed view of the normally cylindrical indicator face;

FIG. 6 is a cross-sectional view through the stem illustrating the mounting of the bimetallic element in the stem;

FIG. 7 is a developed view of a modified cylindrical indicator housing;

FIG. 8 is a cross-sectional view through the center of the modified indicator housing; and FIG. 9 is a cross-sectional view taken along lines 9—9 of FIG. 8.

As shown in FIG. 1, a thermometer 10 of the present invention is inserted in a steak 11 mounted on a grill 12. The steak is about 1 inch thick and the diameter of the thermometer housing 13 is about 1 inch so that the thermometer can be conveniently positioned in the center of the steak lying parallel to the plane of the grill with the thermometer housing 13 overlying the grill.

The thermometer has stem 15 fixed to the housing 13, the stem having a point 16 at its end adapted to be inserted into the meat. The stem is an elongated tube approximately 5 inches long and secured to a boss 17 adjacent the housing 13. The housing 13 has a lower disk 18 fixed to the end of the boss 17 and formed with a groove 19 around its edge. The housing also has a cap 20 also having a groove 21 around its edge. A cylindrical indicator face 25 is sandwiched between the disk 18 and the cap 20 with the edges of the cylindrical face being disposed in the respective grooves 19 and 21.

The disk 18 and cap 20 have aligned holes in their surfaces through which an elongated bolt 26 passes, the bolt having a nut 27 on its end to clamp the disk 18 and cap 20 securely against the cylindrical face 25. An elongated sleeve 28 serves as a spacer between the disk 18 and the cap 20, the bolt 26 passing through the sleeve 28.

The indicator face 25 has a circumferential slot 30 occupying a little greater than half the circumference of the face 25. The slot 30 is about 5/32 inch wide over most of the operating area of the thermometer indicated at 31 and has a 1/16 inch portion indicated at 32.

Projecting through a small hole 35 of about 0.025 inch is a 0.020 inch shaft 36 of a movable indicator 37. The shaft has a radial arm 38 and an indicator element 39 extending parallel to the axis of the thermometer. The indicator element 39 is visible through the slot 30 of the indicator face in all normal operating conditions of the thermometer from room temperature up to about 200° F. which is beyond the desirable temperature for cooking any meat.

The bolt 26 and sleeve 28 are eccentrically positioned with respect to the axis of the thermometer at a location far out of the path of the indicator element 39 through its normal operating range. Thus, a single bolt 26 secures the assembly together and does it in such a way that there is no interference with the normal operation of the thermometer.

The sleeve 28 permits the bolt 26 to be tightened securely into the nut 27 without any tendency to collapse the cylindrical face where it is weakened by the slot 30.

The stem and bimetallic element are, in general, conventionally formed. The bimetallic element 44 is helical and, as viewed in FIG. 2, is fixed to a block 45 which is in turn fixed to the hollow stem 15 by dimpling the stem tube into the block 45 as shown at 46. The other end 47 is secured to the lower end of the shaft 36 and is free to rotate in accordance with variations in temperature which cause the helical bimetallic element 44 to expand and contract.

The tubular stem is sandblasted or etched along its length between the dimple 46 and the boss 17, leaving the end of the stem with a shiny contrasting finish, so as to indicate to the chef that the stem should be inserted into the meat at least to the sandblasted portion, thereby providing assurance that the entire bimetallic element is lodged well within the meat.

The cylindrical face 25 is initially formed flat as shown in FIG. 5, and its length is just sufficient for its ends to be in abutting engagement when the face 25 is cylindrically formed and lodged in the grooves 19 and 21 between the disk 18 and cap 20. Suitable indicia are indelibly formed on the surface of the cylindrical face 25. The indicia on one side of the slot 30 consists of temperature calibrations. The indicia on the other side consists of information relating to the condition of the meat and types of meat such as "beef rare," "lamb well" and the like.

Located adjacent the juncture between the narrow slot 32 and the wider slot 31 is the indicia "turn meat." This indicia is at a location corresponding to the position of the indicator element 39 when the temperature of the meat is in the range of 100°–105° F. It has been found that turning at this temperature will produce a satisfactory quality of cooking regardless of the initial temperature of the meat and regardless of the final temperature desired as long as the meat is removed from the grill at the desired final temperature.

The face 25 also has room for additional indicia such as operating instructions in the area shown at 48.

The cap 20 preferably has a slot 50 of suitable size to receive the point of a knife so that the thermometer can be rotated to bring the indicia to the most convenient position for viewing by the chef.

In the operation of the invention, the thermometer is inserted into a cut of meat 11 until the shiny section of the stem is obscured and only the sandblasted portion of the stem is visible. The meat is placed on the grill and cooking begins. Initially, the indicator element 39 is in a position behind the thin slot 32 as diagrammatically illustrated in FIG. 5 where it is visible to the chef so that the chef can follow its progress. When the indicator element 39 rotates to a position adjacent the "turn meat" indicia, the chef turns the meat over because its internal temperature has reached approximately 105° F. The turning of the meat probably causes the thermometer to rest in a position where it is not easily viewed by the chef so he inserts a knife in the slot 50 to rotate it into a more visible position. Cooking continues until the quality of doneness as desired by the people about to eat the meat is achieved as indicated by the position of the pointer with respect to the indicia adjacent the cylindrical face 25. These positions are easily viewed through the enlarged slot 31. After the meat has been cooked, the meat is removed from the grill and the thermometer is removed from the meat. Thereafter, the thermometer should be wiped clean of grease and returned to storage. In storage, the indicator element 39 will lie behind the thin slot 32 where it is prevented from damage by surrounding utensils.

In the embodiment of FIGS. 1-6, there is a tendency for the cap 20 to cock out of parallelism with the disk 18 when pressure by the bolt 26 is applied. In cocking, the edge of the cap overlying the slot 30 raises with respect to the housing.

While the cause of the cocking is not completely understood, it has been found that that tendency to cock can be eliminated through the modification of the invention illustrated in FIGS. 7-9. The modification of FIGS. 7-9 involves three features distinguishing it from the embodiment of FIGS. 1-6.

First, a recess 60 is formed in the upper edge of the housing 25 and located at a position remote from the bolt 26. In that position it overlies the slot 30 and is substantially coextensive with it.

Second, the bolt is applied without the surrounding sleeve 28 of the FIGS. 1-6 embodiment. The absence of the sleeve not only facilitates assembly but additionally permits the bolt to apply to the cap the required force against the cylindrical housing which, in cooperation with the recess 60, effects a placement of the cap on the housing parallel to the disk 18.

Third, two bridges 61 are formed integrally with the cylindrical housing 25, the bridges 61 extending across the slot 30 and resisting the tendency of the slot to close due to the force of the bolt on the cap 20.

These three features contribute to the more pleasing and uniform appearance of the assembled thermometer and facilitate the assembly of the unit.

If desired, the thermometer may also be used for roasting meat or poultry in the conventional fashion.

I claim:

1. In a grilling thermometer having an elongated stem, a temperature sensor in said stem, and an indicator connected to said sensor and projecting from said stem, the improvement comprising,
   a disk mounted on said stem perpendicular to the axis of said stem,
   a cylindrical housing mounted on said disk,
   a cap mounted on said housing perpendicular to the axis of said stem,
   said indicator projecting into said housing through the center of said disk and extending radially toward said housing,
   a bolt connecting said cap to said disk to clamp said housing between said cap and disk, said bolt being offset from the center of said disk in a portion of said housing remote from said indicator adjacent said cap,
   the edge portion of said cylindrical housing remote from said bolt being recessed, thereby maintaining said disk and cap in substantial parallelism when said housing and cap are assembled to said disk.

2. A thermometer as in claim 1, said housing having a circumferential slot under said recess through which said indicator is visible, said slot extending through an arc greater than 180°,
   and two bridges integral with said housing extending across said slot intermediate their ends to resist closure of said slot when said housing is clamped between said cap and disk.

3. A thermometer as in claim 1 in which
   said housing has a circumferential slot under said recess,
   said slot and recess being substantially coextensive and extending through an arc greater than 180°.

4. A meat thermometer adapted for direct exposure to flame, smoke and grease and temperatures of the order of 500° F. comprising a pointed stem containing a bimetallic element in its pointed end,
   a housing mounted on the opposite end of said stem, said housing comprising a circular disk and cap spaced from each other and lying generally in planes perpendicular to the axis of the stem,
   a cylindrical indicator face fixedly sandwiched between said disk and cap, said cylindrical indicator being a strip which has its ends brought together to form a cylinder of approximately 1 inch outside diameter,
   said cylindrical indicator face being uncovered,
   indicia indelibly formed on said indicator face and adapted to withstand direct exposure to flame, smoke and grease accompanying broiling meat,
   a slot in a substantial portion of the circumference of said cylindrical indicator face,
   at least one bridge integral with said indicator face extending across said slot to resist closure of said slot when said indicator face is clamped between said disk and cap,
   a bolt eccentrically located with respect to the axis of said stem clamping said disk and cap against said cylindrical face,
   and an indicator disposed in said housing and connected to said bimetallic element, said indicator being located adjacent said slot, said indicator being rotatable through a path adjacent the cylindrical indicator face, said bolt being out of the normal operating path of said indicator element.

* * * * *